C. CARROLL.
COUCH.
APPLICATION FILED DEC. 2, 1915.

1,191,664.

Patented July 18, 1916.

WITNESSES:

INVENTOR
CHARLES CARROLL,
BY Munn & Co.
ATTORNEYS

UNITED STATES PATENT OFFICE.

CHARLES CARROLL, OF CHICAGO, ILLINOIS.

COUCH.

1,191,664.  Specification of Letters Patent.  Patented July 18, 1916.

Application filed December 2, 1915. Serial No. 64,687.

*To all whom it may concern:*

Be it known that I, CHARLES CARROLL, a citizen of the United States, and a resident of Chicago, in the county of Cook and State of Illinois, have invented a new and useful Improvement in Couches, of which the following is a specification.

My invention is an improvement in couches, and the invention has for its object to provide a device of the character specified, wherein the couch is so mounted and arranged that it may be used as a vibrator for the treatment of certain affections of the system, the couch comprising a body of the usual construction and a mounting for imparting a series of rapidly succeeding vibrations to the body.

Figure 1:
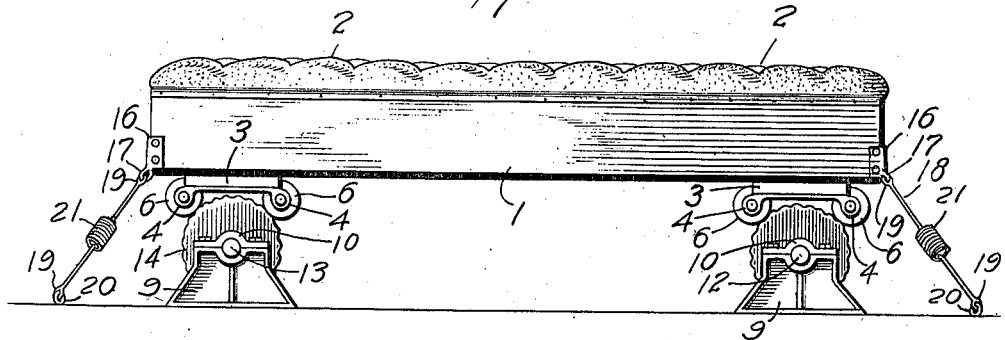
Figure 2:
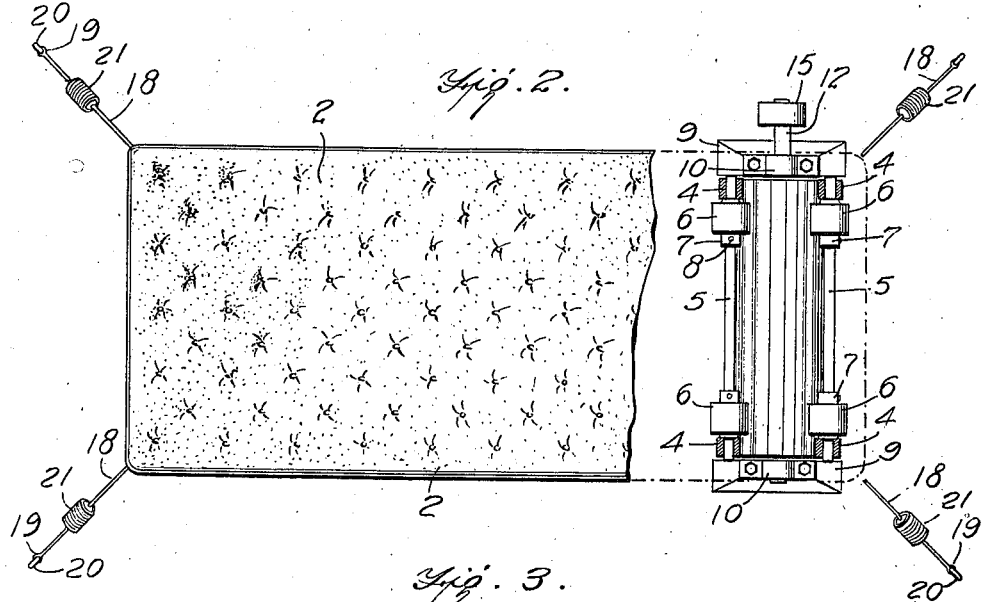
Figure 3:
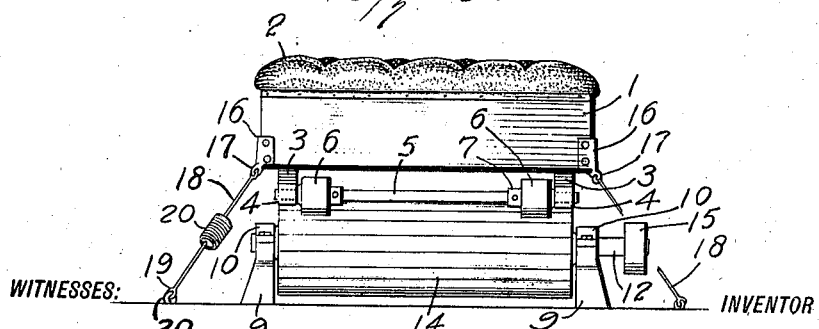

In the drawings: Figure 1 is a front view of the couch, Fig. 2 is a top plan view with parts broken away to show the mounting, and Fig. 3 is an end view.

In the present embodiment of the invention, a couch body is provided, the said body comprising a frame 1 of rectangular form and of usual construction, having at the upper surface thereof a padded upholstered cushioned surface 2, connected to the body in the usual manner and supported by springs.

The body is provided with a pair of depending pedestals 3 at each end, the members of each pair being in register transversely of the frame, and each pedestal is provided with a pair of bearings 4, the said bearings being at the ends of the pedestal, and the bearings of this pedestal register with those of the pedestal at the opposite side of the frame. A shaft 5 is journaled in each pair of registering bearings, and each shaft is provided with wheels 6 near its ends. The wheels 6 are arranged between the bearings 4 and a collar 7 mounted on the shaft 5 and held in adjusted position by means of a set screw 8. A pair of bearing standards 9 is arranged at each end of the couch, and each standard is provided with a sectional bearing 10. The bearings 10 of the standards at each end of the couch are in register or alinement, and shafts 12 and 13 are journaled in the registering bearings at each end of the couch. A roller 14 is secured to each shaft between the bearing standards and each of the said rollers has its peripheral surfaces longitudinally grooved or corrugated as shown in the drawing. One of the shafts 12, in the present instance, is provided with a pulley 15 at one end, the said end of the shaft being extended beyond the bearing 10, and by means of the pulley the adjacent shaft 12 may be connected with a suitable source of power to rotate the rollers.

The wheels 4 of each pedestal engage the peripheral surface of the adjacent roller, and the said wheels are spaced apart a sufficient distance to permit the wheels to engage the rollers in the manner shown in Fig. 1. Since the wheels 6 engage the corrugated or roughened rollers directly it will be evident that when the said rollers are rotated in either direction a series of rapidly succeeding vibrations or jars will be imparted to the wheels and to the couch. The members of each pair of wheels 6 of a pedestal are spaced apart a distance corresponding approximately to the diameter of the roller, as clearly shown in Fig. 1, to prevent or lessen the probability of the wheels riding up on the rollers. Other mechanism is however, provided for preventing this riding motion, and to hold the couch body in central position. The said mechanism comprises angle plates 16 secured to each corner of the couch frame, and each angle plate has an eye 17 at its lower end.

A link 18 is arranged at each corner of the couch, each of the said links having eyes 19 at its opposite ends. One of the eyes 19 of each link engages the eye 17 of an angle plate, and the other eye of the link engages an eye 20 secured to the supporting surfaces for the standards 9. Each link extends outwardly and downwardly away from the adjacent corner of the couch as clearly shown, and a coil spring 21 is interposed in the length of each link. This spring 21 may be integral with the link if desired, or the link may be sectional and the ends of the link may be connected to the spring. When the rollers 14 are rotated a series of successive shocks or jars will be imparted to the couch 1—2, and the patient to be treated will recline upon the couch during this treatment. Thus a series of rapidly succeeding vibrations will be imparted to the patient, and this may continue so long as the rollers are rotated.

The rapidity of the vibration imparted to the couch will depend upon the speed of rotation of the rollers 14, and this speed may be varied from slow to exceedingly rapid in accordance with the conditions of the patient to be treated. The links and springs hold the couch in central position, and in the proper relative position with respect to the rollers.

I claim:—

1. A couch, comprising a body, a pair of transversely alined standards at each end of the body, a roller journaled in each pair of standards, each roller having its peripheral surface corrugated or grooved longitudinally of the roller, a pair of pedestals connected with the couch body at each end thereof and in alinement transverse to the body, a pair of shafts journaled in the pedestals at each end of the body and parallel with each other, wheels secured to each shaft near the ends thereof and engaging the roughened surface of the adjacent roller, the shafts being spaced apart a distance corresponding approximately to the diameter of the roller, and yielding mechanism for normally holding the couch in central position, said means comprising links pivoted to the corners of the couch body and extending outwardly and downwardly therefrom to a connection with the supporting surface for the standards, and a spring interposed in the length of each link.

2. A couch, comprising a body, a pair of transversely alined standards at each end of the body, a roller journaled in each pair of standards, each roller having its peripheral surface corrugated or grooved longitudinally of the roller, a pair of pedestals connected with the couch body at each end thereof and in alinement transverse to the body, a pair of shafts journaled in the pedestals at each end of the body and parallel with each other, wheels secured to each shaft near the ends thereof and engaging the roughened surface of the adjacent roller, the shafts being spaced apart a distance corresponding approximately to the diameter of the roller, and yielding mechanism for normally holding the couch in central position.

3. A couch, comprising a body, a roller having a roughened peripheral surface journaled transversely beneath the couch at each end thereof, wheels on the couch and resting on the rollers, and links connected with each corner of the couch and extending outwardly therefrom to a connection with a fixed support, said links being resilient to permit the couch to yield.

4. A couch, comprising a body, a roller having a roughened peripheral surface journaled transversely beneath the couch at each end thereof, wheels on the couch and resting on the rollers, and yielding means connected with the couch for normally holding the couch in position with respect to the rollers.

CHARLES CARROLL.

Witnesses:
 CLEMENT J. MURPHY,
 JOHN LINDSAY.